(12) United States Patent
Hori et al.

(10) Patent No.: US 6,782,963 B2
(45) Date of Patent: Aug. 31, 2004

(54) FOUR-WHEEL VEHICLE FOR TRAVELING ON IRREGULAR ROAD

(75) Inventors: Yoshiaki Hori, Saitama (JP); Takashi Shichinohe, Saitama (JP); Hiroshi Ohri, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 2 days.

(21) Appl. No.: 09/842,251

(22) Filed: Apr. 26, 2001

(65) Prior Publication Data

US 2002/0027036 A1 Mar. 7, 2002

(30) Foreign Application Priority Data

Apr. 26, 2000 (JP) ........................................ 2000-125285

(51) Int. Cl.[7] ............................ B60K 5/04; B60K 17/34
(52) U.S. Cl. ...................... 180/233; 180/297; 180/340
(58) Field of Search .................... 475/47, 59; 74/730.1; 180/233, 247, 248, 249, 250, 297, 340, 348, 374

(56) References Cited

U.S. PATENT DOCUMENTS

| | | | | |
|---|---|---|---|---|
| 2,580,350 A | * | 5/1951 | Arkus-Duntov | .............. 74/665 |
| 2,603,302 A | * | 7/1952 | Anderson | |
| 3,270,830 A | * | 9/1966 | Barrett et al. | |
| 4,441,575 A | * | 4/1984 | Suzuki | ........................ 180/248 |
| 4,449,604 A | * | 5/1984 | Suzuki | ........................ 180/233 |
| 4,650,202 A | * | 3/1987 | Tsuzuki | ....................... 180/248 |
| 4,722,235 A | * | 2/1988 | Kumazawa | ................. 180/297 |
| 5,205,373 A | | 4/1993 | Kadokura et al. | |
| 5,348,516 A | * | 9/1994 | Shibata | ........................ 475/206 |
| 5,467,668 A | * | 11/1995 | Kameda et al. | ............. 180/247 |
| 6,076,623 A | * | 6/2000 | Teraoka et al. | ............. 180/233 |
| 6,158,303 A | * | 12/2000 | Shiraishi et al. | ............. 180/233 |
| 6,382,899 B1 | * | 5/2002 | Harrison et al. | ............ 180/374 |
| 6,392,899 B1 | * | 5/2002 | Harrison et al. | ............ 180/374 |

FOREIGN PATENT DOCUMENTS

| | | | |
|---|---|---|---|
| JP | U6310411 7 | | 7/1988 |
| JP | 4-201731 | * | 4/1992 |
| JP | Y25618 1 | | 2/1993 |
| JP | Y272328 5 | | 5/1995 |

\* cited by examiner

*Primary Examiner*—Anne Marie Boehler
(74) *Attorney, Agent, or Firm*—Birch, Stewart, Kolasch & Birch, LLP

(57) ABSTRACT

A four-wheel vehicle for traveling on an irregular road that is superior in weight balance and traveling stability. A rotating section (radial center line L3) of a torque converter T and a drive shaft (longitudinal center line L2) which transmits a driving force from a transmission mechanism M to front or rear wheels, are distributed right and left in an opposed relationship to each other with respect to a longitudinal center line (L1) of a vehicle body.

18 Claims, 8 Drawing Sheets

FOUR-WHEEL VEHICLE FOR TRAVELING ON IRREGULAR ROAD

BACKGROUND OF THE INVENTION

1. Field of the Invention

The present invention relates to a four-wheel vehicle for traveling on an irregular road, such as a saddle type four-wheel buggy.

2. Description of Background Art

As a vehicle for traveling an irregular road such as a muddy, damp, sandy, snowy, or gravel road, a four-wheel vehicle equipped with balloon tires having low pressure is proposed in Japanese Utility Model Laid-open No. Sho 63-104117 or Publication No. Hei 5-6181 or Hei 7-23285.

In such a four-wheel vehicle for traveling on an irregular road, a driving force from an engine is inputted to a multi-stage transmission through a clutch, a drive shaft is rotated with the driving force provided from the multi-stage transmission, the rotation of the driving shaft is transmitted through a propeller shaft and a differential gear to right and left driving shafts disposed transversely, and right and left front wheels (rear wheels) are rotated with rotation of the right and left driving shafts.

The differential gear generally comprises a ring gear, a pair of right and left side gears, and a pair of pinions located between the side gears and meshing with the side gears. The rotation of the propeller shaft is transmitted to the ring gear, one side gear is rotated by rotation of the ring gear, and the rotation of the one side gear is transmitted to the other side gear through a pinion. First ends of driving shafts are connected respectively through constant velocity joints to shaft portions extending outwardly of the right and left side gears and the opposite ends (outer ends) of the driving shafts are connected respectively to wheels also through constant velocity joints.

As described above in connection with the conventional structure, driving shafts for the transmission of a driving force are disposed between the differential gear and the right and left front wheels, and if the driving shafts are independent suspension type driving shafts, they are connected to the differential gear through constant velocity joints so as to be swingable around their connections to the differential gear.

In order that the vehicle can travel stably, it is not desirable for the right and left wheels to have different vertical swing ranges. In this connection, making the right and left driving shafts equal in length is a precondition for ensuring a high traveling stability.

If the right and left driving shafts are made equal in length, the center of the differential gear comes to be positioned approximately on the center line of the vehicle body. Of course, if the shaft portion of one of the paired side gears which constitute the differential gear is made longer, the differential gear can be biased to either the right or the left while keeping both driving shafts equal in length. However, from the standpoint of weight balance, it is desirable that the center of the differential gear and that of the vehicle body are substantially coincident with each other.

If the differential gear is disposed substantially in alignment with the center of the vehicle body, the ring gear as a constituent of the differential gear is displaced to either the right or the left, and the propeller shaft having a gear on one end thereof which gear is in mesh with the ring gear and the drive shaft which transmits a driving force to the propeller shaft are also displaced to either the right or the left, resulting in promotion of an unbalanced state.

For remedying this unbalance in the conventional four-wheel vehicle not provided with a torque converter, the differential gear is disposed in a biased state to either the right or the left, as noted earlier, and a propeller shaft and a drive shaft are disposed on the opposite side. In this case, however, the structure of the differential gear becomes complicated; for example, the shaft portions of the right and left side gears are made different in length.

SUMMARY AND OBJECTS OF THE INVENTION

For solving the above-mentioned problems, according to the present invention there is provided a four-wheel vehicle for traveling on an irregular road wherein a driving force of an engine is transmitted to front or rear wheels, characterized in that a torque converter is provided in a power transfer path extending from a crank shaft of the engine up to an input shaft of a transmission, a rotating section of the torque converter, including a pump impeller, a turbine runner and a stator impeller, and a drive shaft for transmitting the driving force from the transmission to the front or rear wheels, are distributed right and left with respect to a longitudinal center line of a body of the vehicle, and the torque converter is disposed so that a radial center line of the rotating section thereof is parallel to the longitudinal center line of the vehicle body.

According to the above construction, the torque converter and the drive shaft, which are heavy components, are distributed right and left. Consequently, the vehicle is weight-balanced and its traveling stability is enhanced.

Further, since a differential gear connected to a propeller shaft which transmits the driving force to the front or rear wheels is disposed substantially on the longitudinal center line of the vehicle body, a vertical swing range on the right side and that on the left side can be easily made uniform.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described hereinunder with reference to the accompanying drawings.

Figure 1:
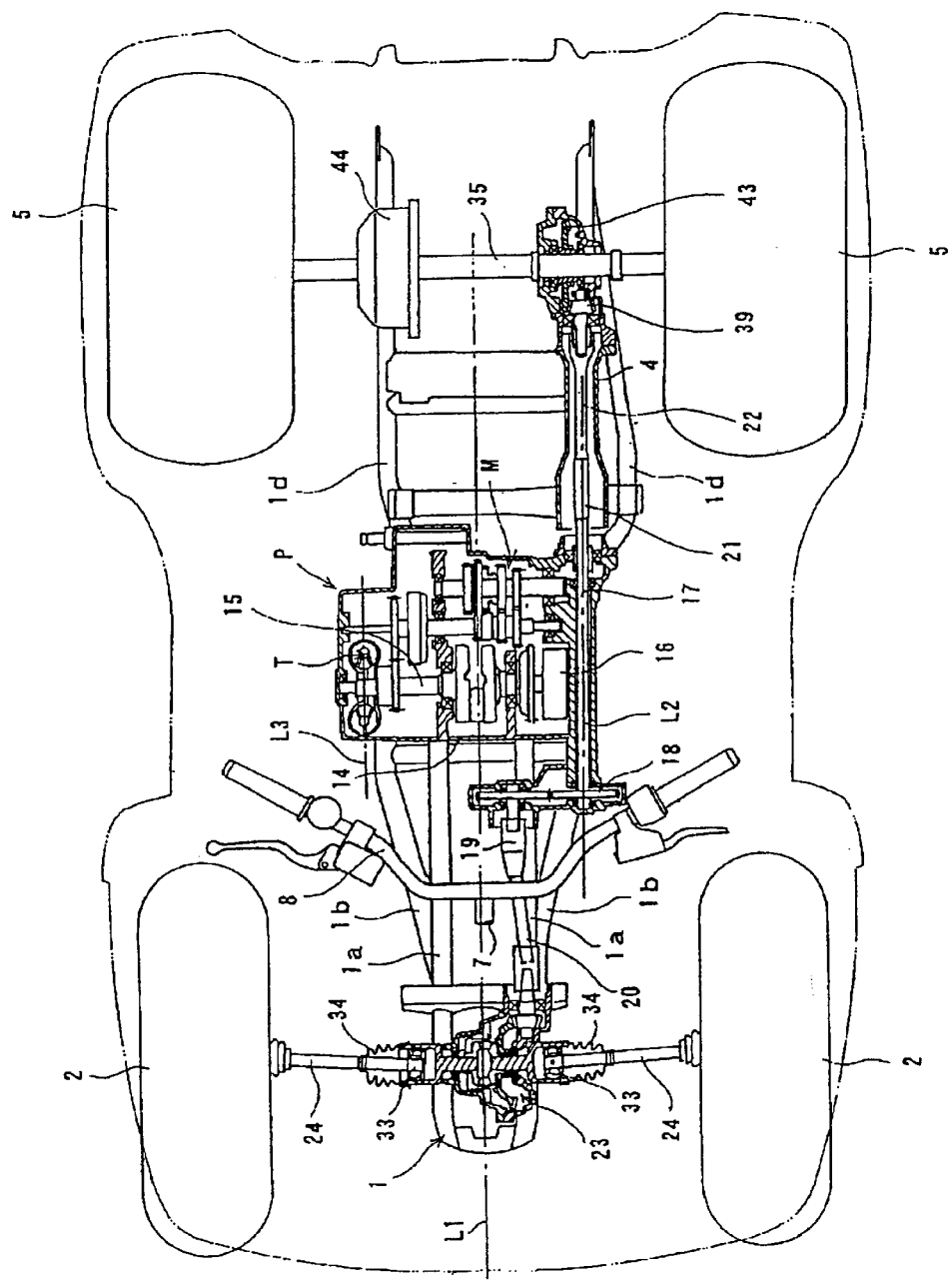
FIG. 1 is a plan view showing a four-wheel vehicle for traveling on an irregular road according to the present invention.

The four-wheel vehicle for traveling on an irregular road illustrated in FIG. 1 is a saddle type four-wheel buggy. In this four-wheel buggy, a body frame 1 is constituted by welding pipes. More specifically, front portions of a pair of right and left main frames 1a are suspended downwardly, front end portions of a pair of right and left lower frames 1b are welded to lower ends of the thus-suspended front portions of the main frames 1a, rear portions 1c of the lower frames 1b are raised obliquely upwardly, intermediate portions of rail members id are welded to upper ends of the rear portions 1c, front end portions of the rail members 1d are welded to rear portions of the main frames 1a, and a pair of down-frames 1e are interposed between the front portions of the main frames 1a and the lower frames 1b.

A pair of right and left front wheels 2 serving as both steering wheels and driving wheels are suspended in a front portion of the body frame 1 each independently through a shock absorber 3, while a pair of right and left rear wheels 5 as driving wheels are suspended integrally by a swing arm 4 through a shock absorber 6, the swing arm 4 being supported at a front end portion thereof swingably by the body frame 1. The front and rear wheels 2 and 5 use a low-pressure balloon tire not higher than 0.5 kg/c$^2$ in grounding surface pressure.

Figure 2:
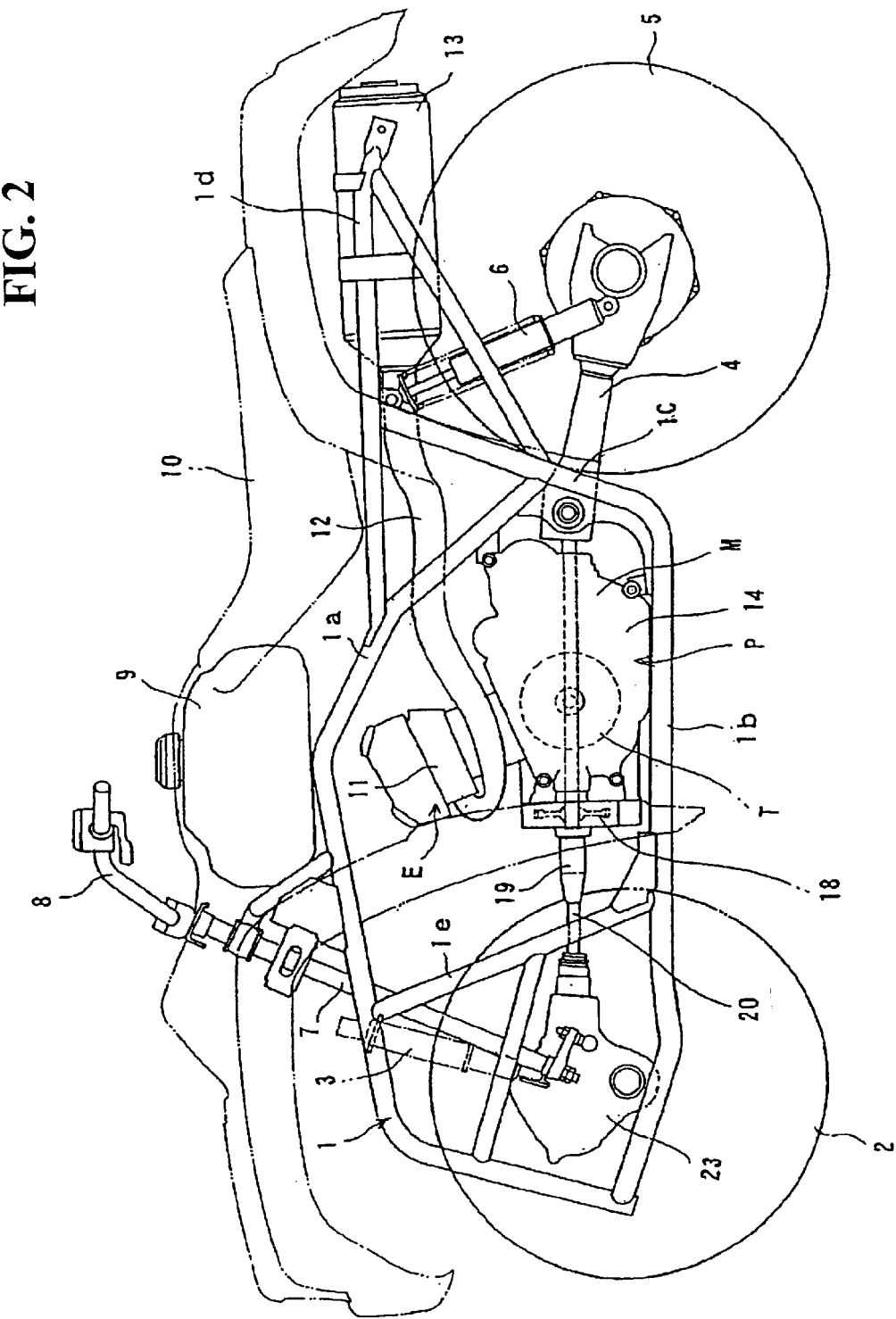
FIG. 2 is a side view showing a four-wheel vehicle for traveling on an irregular road as illustrated in FIG. 1.

As shown in FIG. 2, on the main frames 1a which constitute the body frame 1 there is supported a steering pipe 7 through a gusset plate or the like, and a handle bar 8 is attached to the steering pipe 7.

A fuel tank 9 is disposed at a longitudinally intermediate portion of the body frame 1, and a straddling type seat 10 is disposed on the body frame 1 at a position behind the fuel tank 9. Below the seat 10 and the fuel tank 9 and in a region surrounded by the main frames 1a, lower frames 1b and down-frames 1e there is mounted a power unit P which includes an engine E, a torque converter T and a transmission mechanism M.

One end portion of an exhaust pipe 12 is connected to an exhaust port formed on a front side of a cylinder 11 of the engine E, while the opposite end portion of the exhaust pipe 12 extends sideways of the power unit P and is connected to a muffler 13 disposed sideways of a rear portion of the vehicle body. An intake system is connected to a rear side of the cylinder.

A crank case 14 underlies the engine E and a crank shaft 15 is supported rotatably within the crank case 14. One end of the crank shaft 15 is connected to a pump impeller of the torque converter T, while the opposite end of the crank shaft is connected to a generator 16.

A driving force from the torque converter T is transmitted to a drive shaft 17 through the transmission mechanism M.

A front end portion of the drive shaft 17 is connected to a propeller shaft 20 for front wheels through a gear train 18 and a constant velocity joint 19, while a rear end portion of the drive shaft 17 is connected through a constant velocity joint 21 to a propeller shaft 22 for rear wheels disposed within the swing arm 4.

Since the gear train 18 is provided, the propeller shaft 20 for the front wheels is positioned close to a longitudinal center line (L1) of the vehicle body with respect to the drive shaft 17 and within a region surrounded by the right and left lower frames 1b as constituents of the body frame 1 in a plan view. Consequently, the propeller shaft 20 can project forwardly therefrom.

Rotation of the propeller shaft 20 for the front wheels is transmitted to right and left driving shafts 24 through a differential gear 23 and the rotation of the driving shafts 24 is transmitted to the front wheels 2 through the constant velocity joints (not shown).

Figure 3:
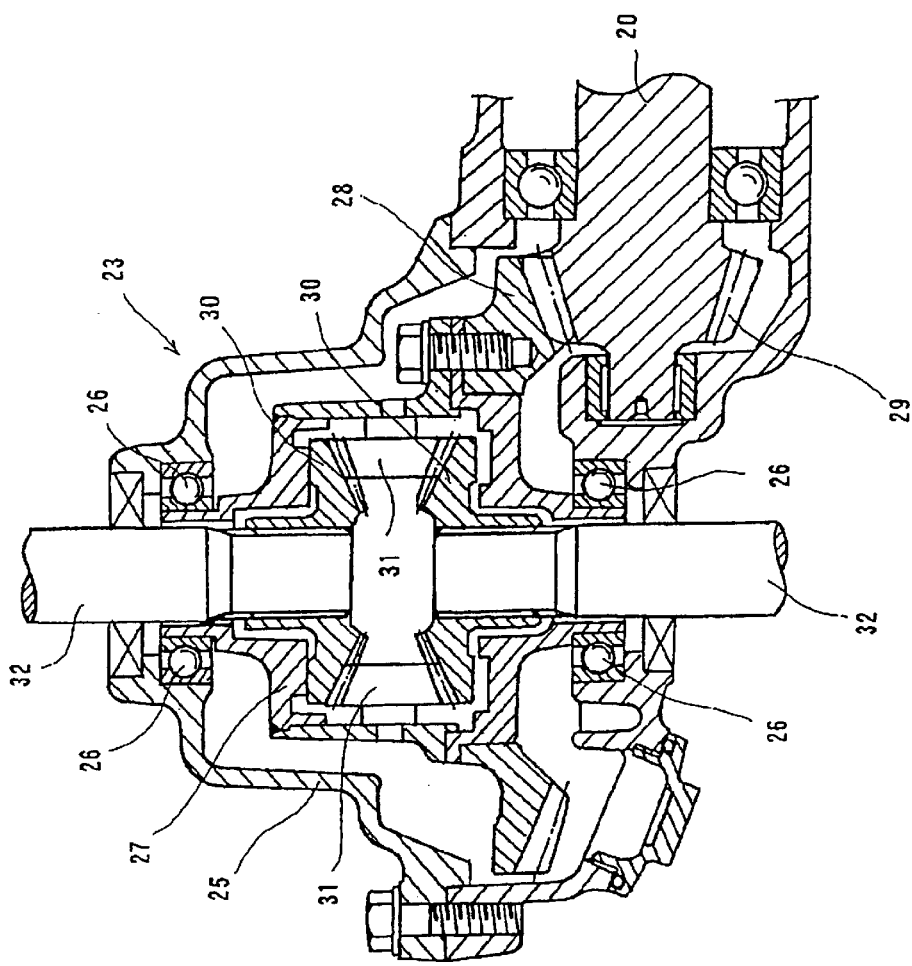
FIG. 3 is an enlarged sectional view of a differential gear and the vicinity thereof in the four-wheel vehicle for traveling on an irregular road shown in FIG. 1.

The differential gear 23 has such a structure as shown in FIG. 3. In the same figure, a box 27 is mounted within a case 25 rotatably through ball bearings 26, a ring gear 28 is secured to the box 27, a pinion gear 29 formed on a front end portion of the propeller shaft 20 for front wheels is brought into mesh with the ring gear 28, and rotation of the ring gear 28 is transmitted to one of right and left side gears 30. Further, the rotation of the one side gear 30 is transmitted to the other side gear 30 via pinion gears 31 mounted between and meshing with the right and left side gears 30, causing shafts 32 to rotate which shafts 32 are splined respectively to central holes formed in the side gears 30.

The right and left shafts 32 and the right and left driving shafts 24 are respectively connected through constant velocity joints 33 and each of the connections is covered with a bellows cover 34.

Side members 35 formed by pipes are provided at a rear end portion of the swing arm 4 which receives therein the propeller shaft 22 for the rear wheels, and driving shafts 36 for rotating the rear wheels 5 are received respectively within the side members 35.

Figure 4:
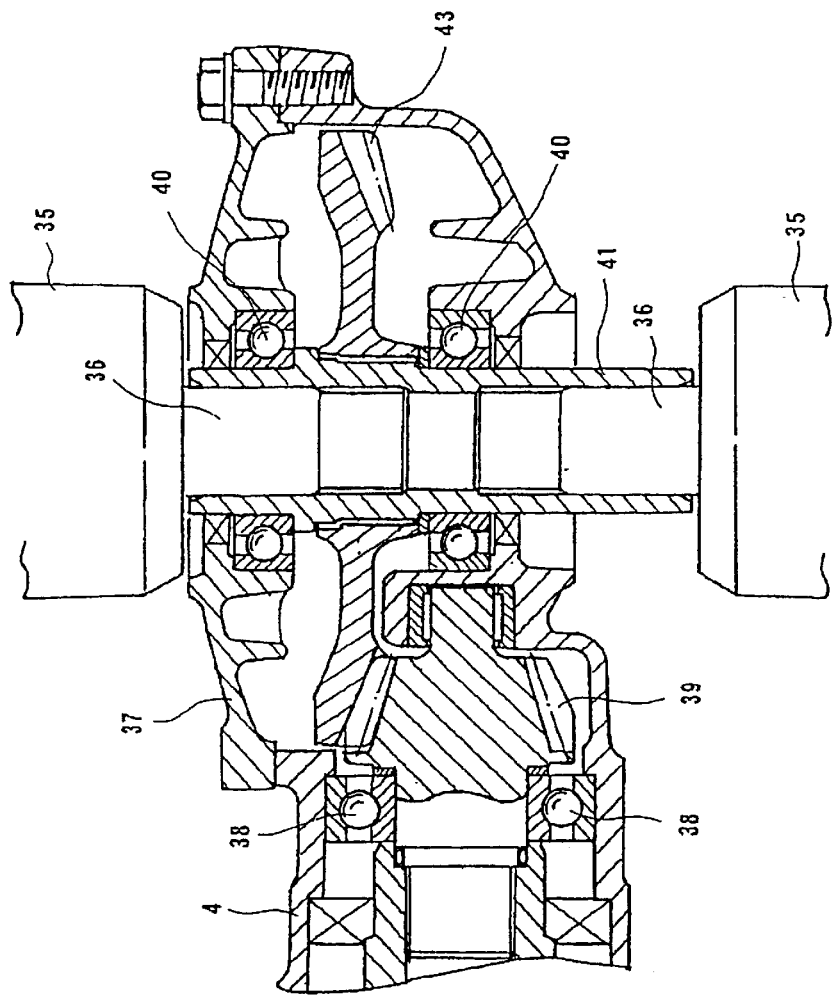
FIG. 4 is an enlarged sectional view of a connection between a propeller shaft for rear wheels and rear wheel driving shafts in the four-wheel vehicle shown in FIG. 1.

FIG. 4 illustrates a structure for transmitting a driving force to each of the driving shafts 36. As shown in FIG. 4, a case 37 is provided at the rear end portion of the swing arm 4, and within the case 37 is disposed a pinion 39 through a ball bearing 38. Also disposed within the case 37 is a cylindrical member 41 supported through ball bearings 40 both rotatably so as to have respective rotational axes 90° different from each other. The driving force from the propeller shaft 22 for the rear wheels is transmitted to the pinion 39 through a constant velocity joint 42.

The driving shafts 36 are splined to the inside of the cylindrical member 41 so as to be adjustable in their axial length, while a ring gear 43 is splined to the outside of the cylindrical member 41, and the pinion 39 is brought into mesh with the ring gear 43. After all, the driving force from the propeller shaft 22 for rear wheels is transmitted to the rear wheels 5.

As shown in FIG. 1, a driving force transmitting section for transmitting the driving force to the driving shafts 36 is biased to the left-hand side with respect to the longitudinal center line (L1) of the vehicle body, and a brake drum 44 is disposed on the right-hand side with respect to the longitudinal center line (L1) to keep the weight balance.

As shown in FIG. 1, the differential gear 23 is disposed so that the center thereof is substantially aligned with the longitudinal center line (L1) of the vehicle body, a center line (L2) extending in the longitudinal direction of the drive shaft 17 is positioned on the left-hand side of the vehicle body and in parallel with the longitudinal center line (L1) of the vehicle body, and a radial center line (L3) of a rotating section of the torque converter T, including pump impeller, turbine runner and stator impeller, is positioned on the right-hand side of the vehicle body and in parallel with the longitudinal center line (L1) of the vehicle body.

Thus, since the rotating section (radial center line L3) of the torque converter T and the drive shaft (longitudinal center line L2) which transmits the driving force from the transmission mechanism M to the front or rear wheels are distributed right and left in an opposed relation to each other with respect to the longitudinal center line (L1) of the vehicle body, it becomes possible to improve the weight balance.

Figure 5:
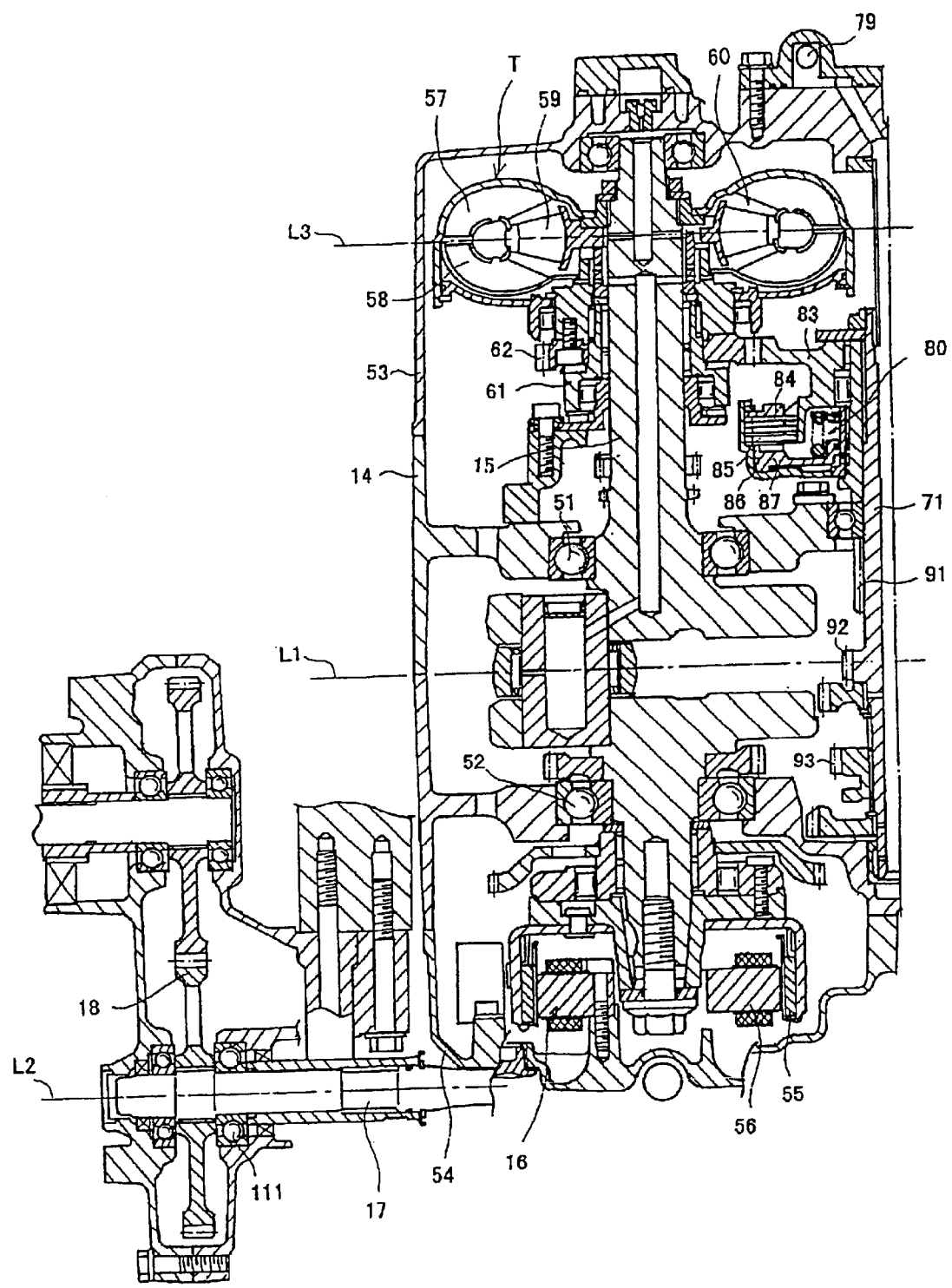
FIG. 5 is an enlarged sectional view of a torque converter and the vicinity thereof in a power unit mounted on the four-wheel vehicle for traveling on an irregular road according to the present invention.
Figure 6:
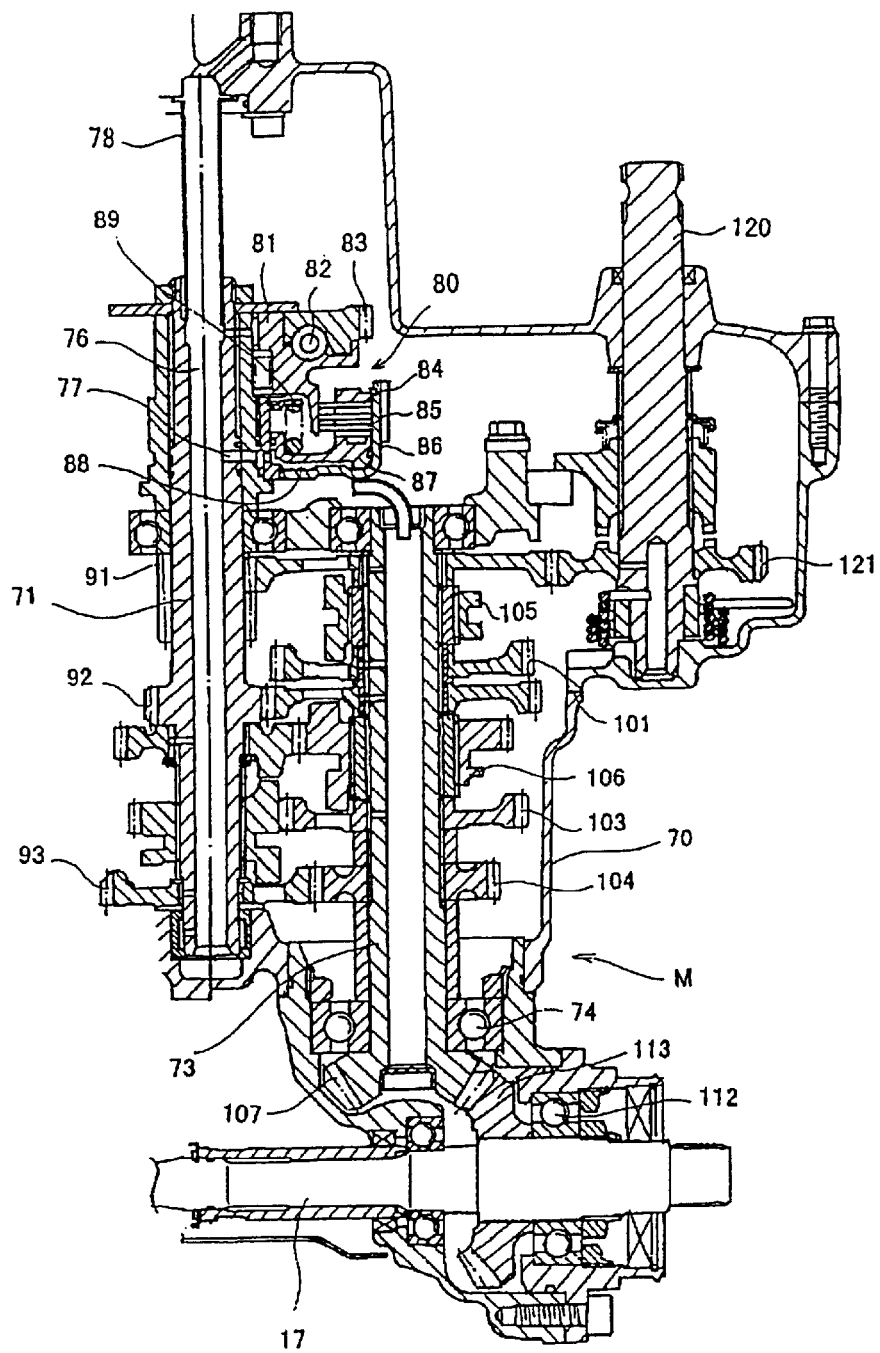
FIG. 6 is an enlarged sectional view of a transmission included in the power unit shown in FIG. 5.

Next, the structure of the power unit P will be described below with reference to FIGS. 5 and 6 which are sectional plan views.

Within the crank case 14, the crank shaft 15 is supported rotatably through ball bearings 51 and 52. The crank shaft 15 is disposed in parallel with the width direction of the vehicle body, i.e., perpendicularly to the longitudinal direction of the vehicle body.

Both ends of the crank shaft 15 project from the crank case 14 and a portion thereof projecting from the right side face of the crank case 14 is received within a right side cover 53 attached to the crank case 14, while a portion thereof projecting from the left side face of the crank case 14 is received within a left side cover 54 attached to the crank case 14, with the generator 16 being mounted on the crank shaft 15 projecting from the left side face of the crank case 14. The generator 16 comprises a rotor 55 mounted on the crank shaft 15 and a stator 56 fixed to the left side cover 54.

On the other hand, the torque converter T is mounted on the crank shaft 15 projecting from the right side face of the crank case 14. The torque converter T is provided with a rotating section 60 which comprises a pump impeller 57, a turbine runner 58 and a stator impeller 59. The interior of the rotating section 60 is filled with oil and radial center line (L3) of the rotating section is positioned face to face with the longitudinal center line (L2) of the drive shaft with respect to the longitudinal center line of the vehicle body (L1).

The pump impeller 57 rotates integrally with the crank shaft 15, while the turbine runner 58 is disposed face to face with the pump impeller 57 and is fixed to a turbine shaft which is disposed rotatably and coaxially with respect to the crank shaft 15. The turbine shaft and the pump impeller 57 are connected together through a one-way clutch. The rotation of the pump impeller 57 is transmitted to the turbine runner 58 through the inside oil and power is transmitted to the transmission mechanism M through a primary gear and a clutch.

A stator shaft of the stator impeller 59 is rotatable about a support member which is fixed to the crank case through a one-way clutch. The stator impeller 59 does not rotate when there is a great difference between the rotation of the pump impeller 57 and that of the turbine runner 58. A torque reaction force to the stator impeller 59 is amplified by smoothing the flow of oil from the turbine runner 58. On the other hand, when the difference in rotation between the pump impeller 57 and the turbine runner 58 is small, the stator impeller 59 idles so as not to act as resistance.

The transmission mechanism M is received within a transmission case 70 formed integrally with the crank case 14 and an input shaft 71 parallel to the crank shaft 15 is supported rotatably by the transmission case 70 through ball bearings 72. Likewise, an output shaft 73 parallel to the crank shaft 15 is supported rotatably by the transmission case 70 through ball bearings 74.

A clutch 80 is mounted on one end (torque converter side) of the input shaft 71. The clutch 80 is located between the torque converter T and the crank case 14 in such a manner that a portion thereof overlaps the torque converter when looking in the vehicular longitudinal direction, thereby attaining an effective utilization of space.

The clutch 80 comprises a clutch center 81 which is rotatable about the input shaft 71, a driven gear 83 connected to the clutch center 81 through a buffer spring 82 and meshing with a driving gear 62 in the torque converter T, a plurality of first clutch discs 84 engaged with an outer periphery of the clutch center 81 so as to be incapable of relative rotation, a plurality of second clutch discs 85 disposed in a lapped state between the plural first clutch discs 84, a clutch drum 86 which receives the first and second clutch discs 84, 85 therein and which rotates integrally with the input shaft 71 while allowing an outer periphery of the second clutch discs 85 to be engaged therewith in a relatively rotatable infeasible manner, and a piston 87 slidably fitted within the clutch drum 86.

An oil chamber 88 is formed between the piston 87 and the inside of the clutch drum 86, and a spring 89 is disposed for the piston 87 on the side opposite to the oil chamber 88 to urge the piston in a diminishing direction of the oil chamber 88.

An oil passage 76 is formed axially in the input shaft 71. The oil passage 76 and the oil chamber 88 are communicated with each other through an oil passage 77. Further, oil is fed to the oil passage 76 through a pipe 78 which extends through the right side cover 53.

When oil is fed into the oil chamber 88 through the pipe 78, and the oil passages 76 and 77, the piston 87 moves against the spring 89, causing the first and second clutch discs 84, 85 to come into pressure contact with each other and causing the clutch 80 to turn ON, thereby allowing the power from the torque converter T to be transmitted to the input shaft 71.

Conversely, upon discharge of oil from the oil chamber 88, the piston 87 moves in the reverse direction and the first and second clutch discs 84, 85 move away from each other, thus turning OFF the clutch 80.

In this embodiment, the turning ON-OFF of the clutch 80 is performed in accordance with signals provided from an idling sensor and a gear shift operation sensor. More specifically, during idling of the engine or when a gear shift operation is performed, the clutch 80 is turned OFF to block the transmission of power from the torque converter T to the input shaft 71.

By so doing, it is possible to eliminate a creep phenomenon during idling and diminish the resistance during a gear shift operation.

Driving gears 91, 92 and 93 are mounted on the input shaft 71 integrally with the input shaft or separately from the input shaft but integrally rotatably with the input shaft. Driven gears 101, 102, 103 and 104 are mounted on the output shaft 73 rotatably. The driving gear 91 and the driven gear 101 are in mesh with each other and conjointly constitute a low-shift gear train. Likewise, the driving gear 92 and the driven gear 102 are in mesh with each other and conjointly constitute a 2nd-shift gear train, the driving gear 93 and the driven gear 103 are in mesh with each other and conjointly constitute a 3rd-shfit gear train. Further, a counter shaft (not shown) is present between the input shaft 71 and the output shaft 73, and the driving gear 91 and the driven gear 104 are in mesh with each other through an intermediate gear mounted on the counter shaft. The driving gear 91, the intermediate gear and the driven gear 104 constitute a reverse-shift gear train.

Dog clutches 105 and 106 are splined onto the output shaft 73 so as to be rotatable integrally with the output shaft 73 and movable axially. The dog clutches 105 and 106 are brought into engagement with any of the driven shafts 101, 102, 103 and 104 in an alternative manner by means of a shift fork, not shown, whereby there is established a low-, 2nd-, 3rd- or reverse-shift gear train.

When the dog clutches 105 and 106 are not engaged with any of the driven gears, this state is a neutral state.

A starter shaft 120 is inserted into the transmission case 70 in parallel with the output shaft 73 and a gear 121 formed on the starter shaft 120 is in mesh with the driven gear 101.

On the other hand, the drive shaft 17, which is at angle of 90° relative to the output shaft 73, is supported by the transmission case 70 rotatably through ball bearings 111 and 112, and a driving gear 107 mounted on the output shaft 73 and a driven gear 113 mounted on the drive shaft 17 are in mesh with each other. Therefore, the drive shaft 17 is rotated at a gear ratio and in a rotational direction both corresponding to the established gear train. This rotative driving force is transmitted to the front and rear wheels 2, 5 through propeller shafts 20 and 22.

Figure 7:
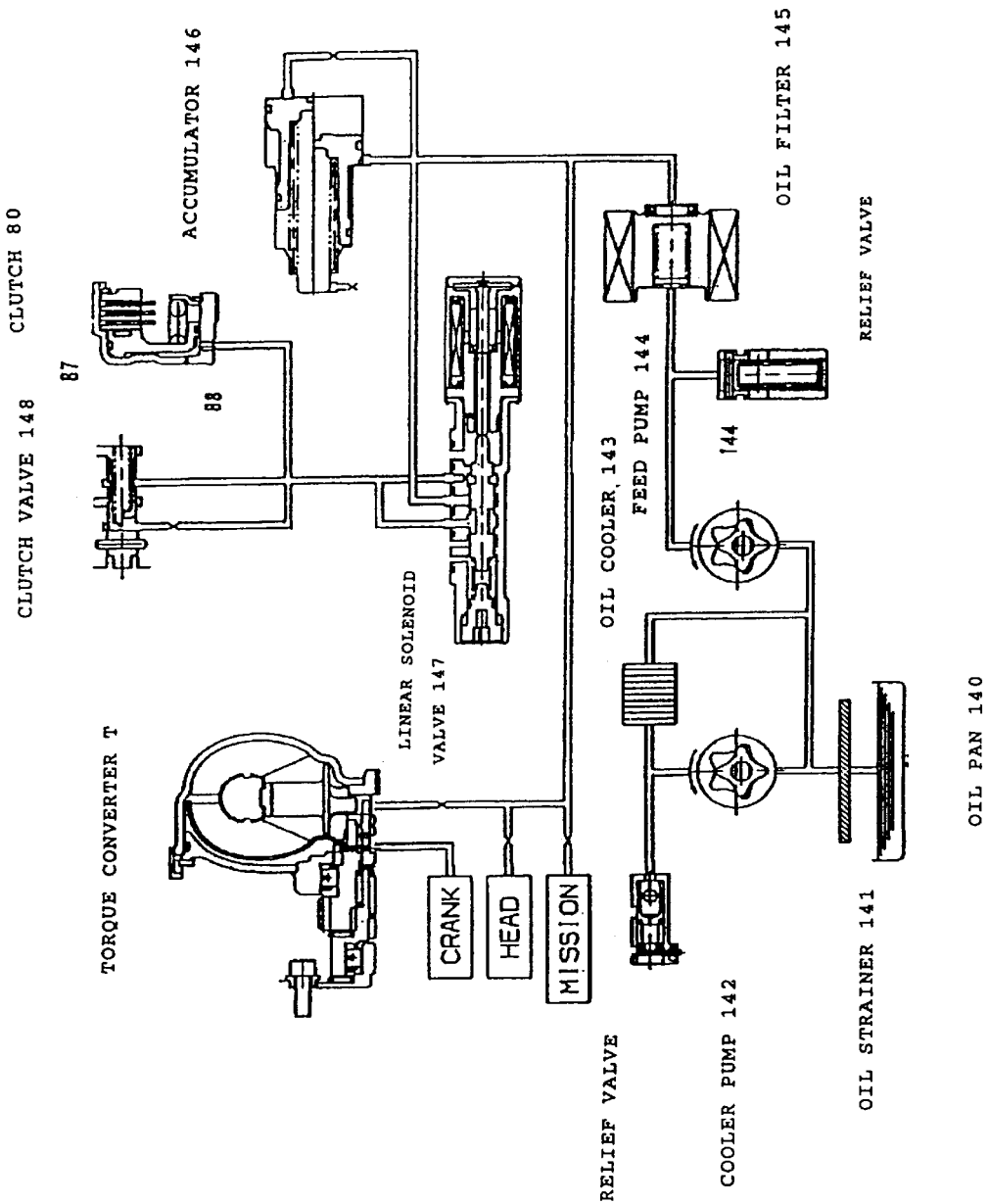
FIG. 7 illustrates a hydraulic control circuit for the power unit shown in FIGS. 5 and 6.

FIG. 7 illustrates an example of a hydraulic control circuit for the power unit P. In this example, oil is used not only as a hydraulic operating oil for the torque converter T and the clutch 80 but also as a lubricating oil to be fed to the crank shaft 15, cylinder head 11 and transmission mechanism M.

Oil present within an oil pan 140 is sucked by a cooler pump 142 through an oil strainer 141, then is cooled by an oil cooler 143 and is again returned into the oil pan 140.

Also, the oil in the oil pan 140 is sucked by a feed pump 144 through the oil strainer 141 and is fed to a linear solenoid valve 147 through an oil filter 145 and an accumulator 146. By operating the linear solenoid valve 147 the oil is fed to the oil chamber 88 formed in the clutch 80, causing the piston 87 to move against the spring, thereby causing the first and second clutch discs to come into pressure contact with each other to turn ON the clutch 80.

As a result of the clutch 80 having been turned ON, the driving force from the torque converter T is transmitted to the transmission mechanism M, as noted earlier.

When the linear solenoid valve 147 is closed, a clutch valve is returned by a return spring and the oil present within the oil chamber 88 is discharged rapidly, so that the clutch 80 turns OFF.

A portion of the oil which has passed through the oil filter 145 is fed as a lubricating oil to both the cylinder head 11 and the transmission mechanism M, while the remaining oil is fed as a hydraulic operating oil to the torque converter T. Further, the oil flowing out of the torque converter T is fed as a lubricating oil to the crank shaft 15.

The oil after use as a lubricating oil or a hydraulic operating oil is again collected into the oil pan 140.

Figure 8:
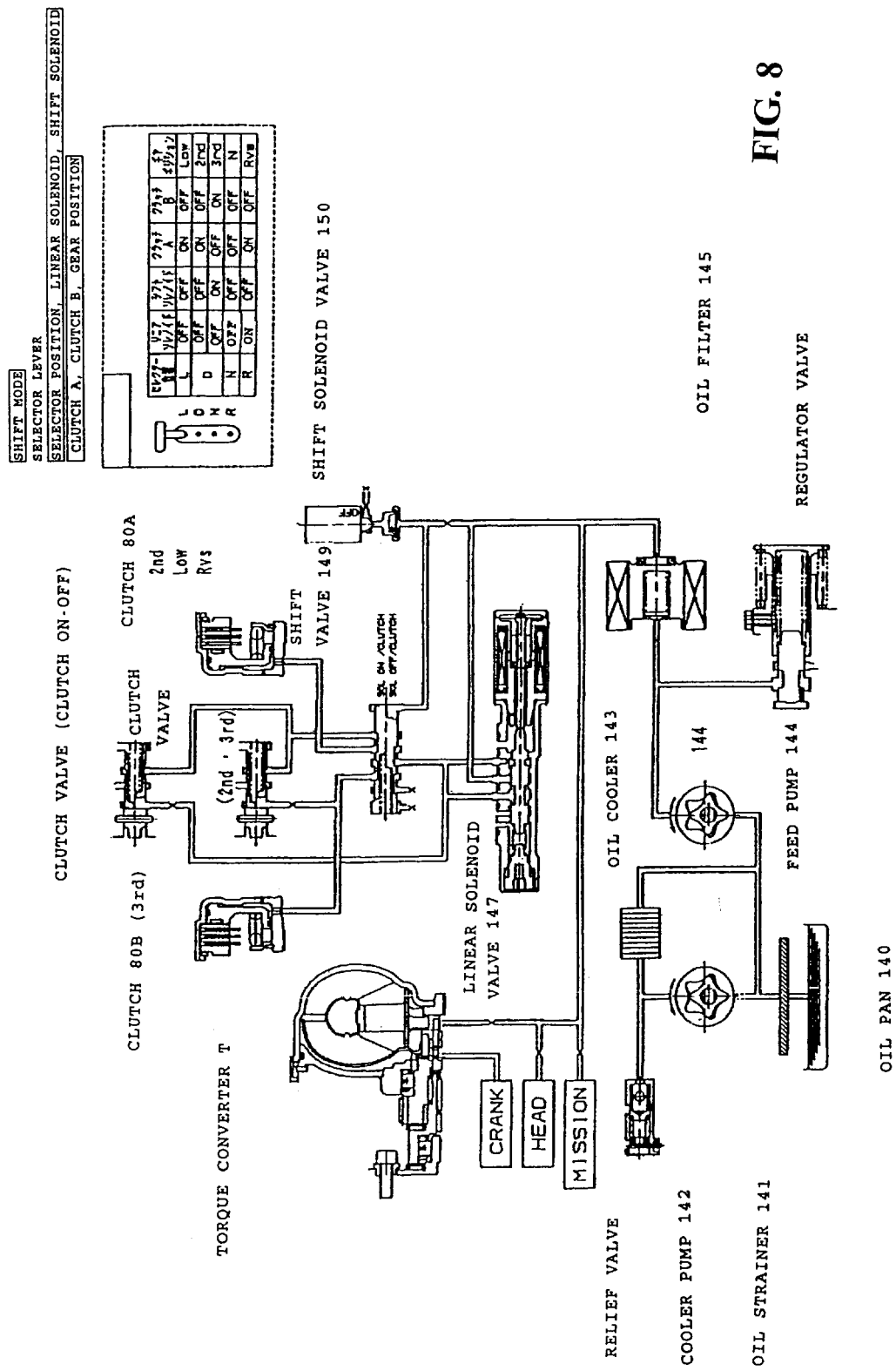
FIG. 8 illustrates another example of a hydraulic control circuit.

FIG. 8 illustrates another example of a hydraulic control circuit. In this example, a clutch is divided into two, that is, a clutch 80A and a clutch 80B. By turning ON the clutch 80A it becomes possible to select any of Low gear, 2nd gear and reverse (Rvs) gear, and by turning ON the clutch 80B it becomes possible to select the 3rd gear.

In this example, between the feed pump 144 and the oil filter 145, a relief valve is not provided, but a regulator valve is provided. Further, a shift valve 149 is disposed downstream of the linear solenoid valve 147, and by operating the shift valve 149 with use of a shift solenoid valve 150, oil is fed to either the clutch 80A or the clutch 80B selectively.

In the example illustrated in FIG. 8, as shown in the table of the Shift Mode, if a selector lever is shifted to the L range, the linear solenoid valve 147 turns ON, the shift solenoid valve 150 turns OFF, and the clutches 80A and 80B turn ON and OFF, respectively, to establish the Low gear.

If the selector lever is shifted to the D range, the linear solenoid valve 147 turns OFF, the shift solenoid valve 150 turns OFF, and the clutches 80A and 80B turn ON and OFF, respectively, to establish the 2nd gear.

When the shift solenoid valve 150 turns ON and the clutches 80A and 80B turn OFF and ON, respectively, in accordance with a command provided from a speed sensor, there is established the 3rd gear.

If the selector lever is shifted to the N range, all of the linear solenoid valve 147, shift solenoid valve 150 and clutch 80A turn OFF and the dog clutches all assume a disengaged state, so that the neutral position is established.

Further, if the selector lever is shifted to the R range, the linear solenoid valve 147 turns ON, the shift solenoid valve 150 turns OFF and the clutches 80A and 80B turn ON and OFF, respectively, to establish the Rvs position.

In all of the ranges exclusive of the neutral range and in an idling state, the linear solenoid valve 147 turns ON in accordance with a signal provided from a sensor and closes the oil passage to the clutch, which therefore is released, then upon sensing a signal indicative of an increase in the engine speed, the linear solenoid valve 147 turns OFF, so that the clutch is engaged to start the vehicle.

In the above operations, both clutches 80A and 80B are turned OFF in the neutral state to avoid the occurrence of a creep phenomenon, and also at the time of a gear shift operation the clutches are turned OFF to prevent friction induced by a transmission torque from being exerted on a switching slide portion of the transmission, thereby diminishing the switching resistance of the transmission.

Although it is a saddle type vehicle for traveling on an irregular road that is illustrated in the drawings, the vehicles to which the invention is applicable are not limited to saddle type vehicles.

Although in the illustrated embodiment the rear wheels are made vertically swingable through a swing arm, there may be adopted a four-wheel independent suspension type.

Although it is a full-time four-wheel drive that is illustrated in the drawings, a modification may be made into a part-time four-wheel drive, for example, by disposing a clutch between the drive shaft 17 and the propeller shaft 20 for the front wheels.

According to the present invention, as set forth above, since a radial center line of a rotating section of a torque converter and a longitudinal center line of a drive shaft are distributed right and left in an opposed relation to each other with respect to a longitudinal vehicular center line of a four-wheel vehicle for traveling on an irregular road such as a buggy, it is possible to improve the weight balance and hence possible to attain a high traveling stability.

Further, since a differential gear is positioned substantially on a longitudinal center line of the vehicle body, vertical swing ranges on the right and left sides can be made uniform.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A four-wheel vehicle for traveling on an irregular road wherein a driving force of an engine is transmitted to front or rear wheels, comprising:

a torque converter operatively positioned in a power transfer path extending from a crank shaft of said engine up to an input shaft of a transmission;

a rotating section of said torque converter, including a pump impeller, a turbine runner and a stator impeller, disposed on one side of the vehicle with respect to a longitudinal center line of a body of the vehicle;

a drive shaft and a front propeller shaft for transmitting the driving force from said transmission to the front wheels disposed on an opposite side of the vehicle with respect to the longitudinal center line of the body of the vehicle, a distance between the front propeller shaft and the longitudinal center line of the body being smaller than a distance between the drive shaft and the longitudinal center line of the vehicle, said torque converter being disposed so that a radial center line of the rotating section thereof is parallel to the longitudinal center line of the vehicle body.

2. The four-wheel vehicle for traveling on an irregular road according to claim 1, wherein a differential gear connected to said front propeller shaft which transmits the driving force to the front wheels is disposed substantially on the longitudinal center line of the vehicle body.

3. The four-wheel vehicle for traveling on an irregular road according to claim 2, further including constant velocity joints operatively positioned between said differential gear and drive shafts for said front wheels.

4. The four-wheel vehicle for traveling on an irregular road according to claim 2, wherein said differential gear includes a ring gear with a pinion gear mounted on said front propeller shaft and being in mesh with gear teeth on said ring gear for imparting rotation thereto.

5. The four-wheel vehicle for traveling on an irregular road according to claim 2, further including driving shafts secured to said rear wheels, said driving shafts being splined to a cylindrical member for adjusting the axial length thereof and a ring gear secured to said cylindrical member for engaging a pinion gear for imparting rotational motion thereto.

6. A four-wheel vehicle for traveling on an irregular road wherein a driving force of an engine is transmitted to front wheels, comprising:

a power drive shaft operatively connected to said engine for imparting rotary motion thereto;

a torque converter operatively positioned between said power drive shaft and a crank shaft of said engine up to an input shaft of a transmission;

a center line of rotation of said torque converter, including a pump impeller, a turbine runner and a stator impeller disposed on one side of the vehicle with respect to a longitudinal center line of a body of the vehicle;

a drive shaft and a front propeller shaft for transmitting the driving force from said transmission to the front wheels disposed on an opposite side of the vehicle with respect to the longitudinal center line of the body of the vehicle; and a gear train for connecting the drive shaft to the front propeller shaft in a manner such that the drive shaft and the front propeller shaft have longitudinal axes which are offset from one another, said torque converter being disposed so that a radial center line of the rotating section thereof is parallel to the longitudinal center line of the vehicle body.

7. The four-wheel vehicle for traveling on an irregular road according to claim 6, wherein said front wheels are independent suspension wheels, the driving force of the drive shaft is transmitted to the front wheels through said front propeller shaft and a differential gear, and the center of said differential gear lies approximately on the center line of the vehicle body.

8. The four-wheel vehicle for traveling on an irregular road according to claim 7, further including constant velocity joints operatively positioned between said differential gear and drive shafts for said front wheels.

9. The four-wheel vehicle for traveling on an irregular road according to claim 7, wherein said differential gear includes a ring gear with a pinion gear mounted on said front propeller shaft and being in mesh with gear teeth on said ring gear for imparting rotation thereto.

10. A four-wheel vehicle for traveling on an irregular road wherein a driving force of an engine is transmitted to front or rear wheels, comprising:

a torque converter operatively positioned in a power transfer path extending from a crank shaft of said engine up to an input shaft of a transmission;

a rotating section of said torque converter, including a pump impeller, a turbine runner and a stator impeller, disposed on one side of the vehicle with respect to a longitudinal center line of a body of the vehicle;

a drive shaft and a rear propeller shaft for transmitting the driving force from said transmission to the rear wheels disposed on an opposite side of the vehicle with respect to the longitudinal center line of the body of the vehicle;

a front propeller shaft connected to the drive shaft, the front propeller shaft also being disposed on the opposite side of the vehicle with respect to the longitudinal center line of the body of the vehicle, wherein a distance between the front propeller shaft and the longitudinal center line of the body being smaller than a distance between the rear propeller shaft and the longitudinal center line of the vehicle, said torque converter being disposed so that a radial center line of the rotating section thereof is parallel to the longitudinal center line of the vehicle body.

11. The four-wheel vehicle for traveling on an irregular road according to claim 10, wherein a differential gear connected to said front propeller shaft which transmits the driving force to the front wheels is disposed substantially on the longitudinal center line of the vehicle body.

12. The four-wheel vehicle for traveling on an irregular road according to claim 11, further including constant velocity joints operatively positioned between said differential gear and drive shafts for said front wheels.

13. The four-wheel vehicle for traveling on an irregular road according to claim 11, wherein said differential gear includes a ring gear with a pinion gear mounted on said front propeller shaft and being in mesh with gear teeth on said ring gear for imparting rotation thereto.

14. The four-wheel vehicle for traveling on an irregular road according to claim 11, further including driving shafts secured to said rear wheels, said driving shafts being splined to a cylindrical member for adjusting the axial length thereof and a ring gear secured to said cylindrical member for engaging a pinion gear for imparting rotational motion thereto.

15. A four-wheel vehicle for traveling on an irregular road wherein a driving force of an engine is transmitted to rear wheels, comprising:

a power drive shaft operatively connected to said engine for imparting rotary motion thereto;

a torque converter operatively positioned between said power drive shaft and a crank shaft of said engine up to an input shaft of a transmission;

a center line of rotation of said torque converter, including a pump impeller, a turbine runner and a stator impeller disposed on one side of the vehicle with respect to a longitudinal center line of a body of the vehicle;

a drive shaft and a rear propeller shaft for transmitting the driving force from said transmission to the rear wheels disposed on an opposite side of the vehicle with respect to the longitudinal center line of the body of the vehicle; and a gear train for connecting the drive shaft to a front propeller shaft in a manner such that the front propeller shaft and the rear propeller shaft have longitudinal axes which are offset from one another, the front propeller shaft also being disposed on the opposite side of the vehicle with respect to the longitudinal center line of the body of the vehicle, said torque converter being disposed so that a radial center line of the rotating section thereof is parallel to the longitudinal center line of the vehicle body.

16. The four-wheel vehicle for traveling on an irregular road according to claim 15, wherein said front wheels are independent suspension wheels, the driving force of the drive shaft is transmitted to the front wheels through said front propeller shaft and a differential gear, and the center of said differential gear lies approximately on the center line of the vehicle body.

17. The four-wheel vehicle for traveling on an irregular road according to claim 16, further including constant velocity joints operatively positioned between said differential gear and drive shafts for said front wheels.

18. The four-wheel vehicle for traveling on an irregular road according to claim 16, wherein said differential gear includes a ring gear with a pinion gear mounted on said front propeller shaft and being in mesh with gear teeth on said ring gear for imparting rotation thereto.

* * * * *